United States Patent [19]

Edwards

[11] Patent Number: 4,737,906
[45] Date of Patent: Apr. 12, 1988

[54] MULTIPLE VIRTUAL CONTROL UNIT
[75] Inventor: Lewis M. Edwards, Saugerties, N.Y.
[73] Assignee: International Business Machines Corporation, Armonk, N.Y.
[21] Appl. No.: 781,437
[22] Filed: Sep. 27, 1985
[51] Int. Cl.$^4$ ............................................... G06F 3/00
[52] U.S. Cl. ................................................... 364/200
[58] Field of Search ... 364/200 MS File, 900 MS File
[56] References Cited

U.S. PATENT DOCUMENTS 3,501,749  3/1970  Cuccio ........................... 364/200 X
3,534,338 10/1970  Christensen et al. ............... 364/200
4,124,889 11/1978  Kaufman et al. .................... 364/200
4,319,336  3/1982  Anderson et al. ................. 364/200 X Primary Examiner—Thomas M. Heckler
Attorney, Agent, or Firm—George E. Clark

[57] ABSTRACT

A channel interface multiple virtual control unit controls a plurality of classes of terminal sessions on a graphics system workstation, the multiple virtual control unit includes lookup tables having indicia related to a class of display session to be enabled for controlling a workstation in either a alpha-numeric display mode or a graphics display mode.

6 Claims, 11 Drawing Sheets

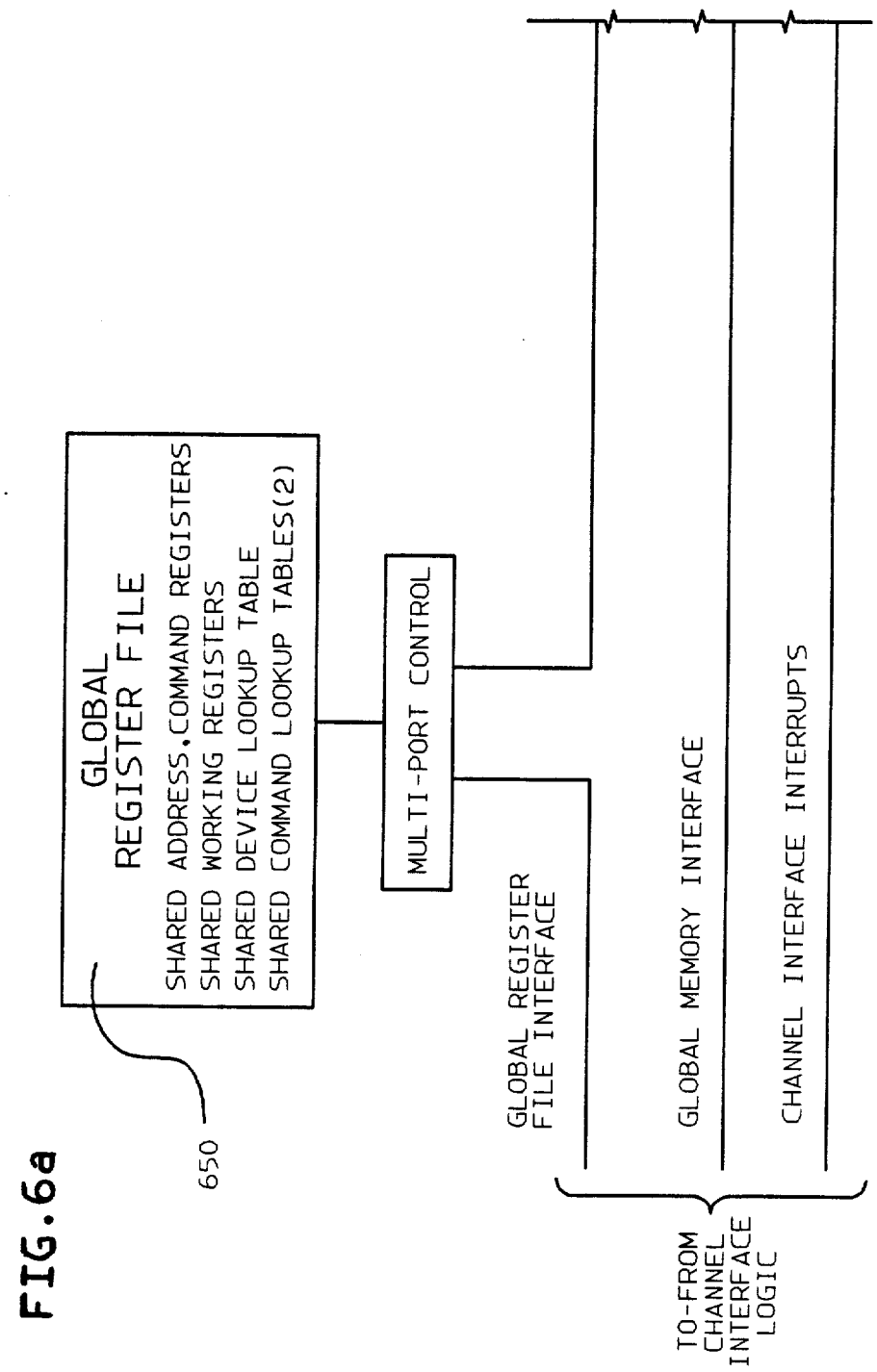

DEFINITIONS:
CUEG ≡ CUE STATUS OWED FOR VIRTUAL CONTROL UNIT: GRAPHICS (5080)

CUED ≡ CUE STATUS OWED FOR VIRTUAL CONTROL UNIT: DISPLAYS (3274)

VCUID ≡ VIRTUAL CONTROL UNIT ID

MULTIPLE VIRTUAL CONTROL UNIT

BACKGROUND OF THE INVENTION

1. Field of the Invention

The present invention relates to information handling systems input/output subsystems and more particularly to apparatus for controlling the flow of information between a host processor channel and one or more workstations.

2. Description of the Prior Art

In the past, when it was desired to have an engineering office environment employing a graphics terminal and an alpha-numeric terminal, it was required that there be two separate display workstations each being connected to an associated control unit having the capability of controlling their respective workstation type.

However, with the development of the IBM 3270 feature for the IBM 5080 graphics system, the need for a separate alpha-numeric workstation such as an IBM 3278 or IBM 3279 terminal was eliminated. The IBM 327X session on the IBM 5080 graphics system was controlled by an IBM 370X Communications controller through a communications line. This configuration, while eliminating one workstation, still required separate controllers for the graphics session and the alpha-numeric session.

In general, the prior art requires a separate real control unit for each session regardless of terminal emulation in a workstation.

SUMMARY OF THE INVENTION

Therefore, it is an object of the present invention to present an alpha-numeric display session and a graphics display session on a single graphics system workstation under the control of a multiple virtual control unit being connected to the graphics system workstation by a single communications line.

It is another object of the present invention to control a plurality of sessions on a graphics systems workstation, wherein at least one of the sessions is not a graphics display session, under the control of a multiple virtual control unit including first lookup table means having indicia related to a type of display session to be enabled for controlling a workstation in either a alpha-numeric display mode or a graphics display mode.

Accordingly, a channel interface multiple virtual control unit controls a plurality of classes of terminal sessions on a graphics systems workstation, the multiple virtual control unit includes lookup tables having indicia related to a class of display session to be enabled for controlling a workstation in either an alpha-numeric display mode or a graphics display mode.

The foregoing and other objects, features and advantages of the invention will be apparent from the more particular description of the preferred embodiments of the invention, as illustrated in the accompanying drawing.

BRIEF DESCRIPTION OF THE DRAWING

FIGS. 6a and FIG. 6b is a block diagram of the system control block shown in FIG. 4.

In the drawing, like elements are designated with similar reference numbers, and identical elements in different specific embodiments are designated by identical reference numbers.

DESCRIPTION OF A PREFERRED EMBODIMENT OF THE INVENTION

Most graphics systems are designated primarily for an engineering office environment. In such environment, most graphics workstation users also have the need for an alpha-numeric display workstation for routine work such as editing, data base management and starting a graphics session on the graphics workstation.

Figure 1:
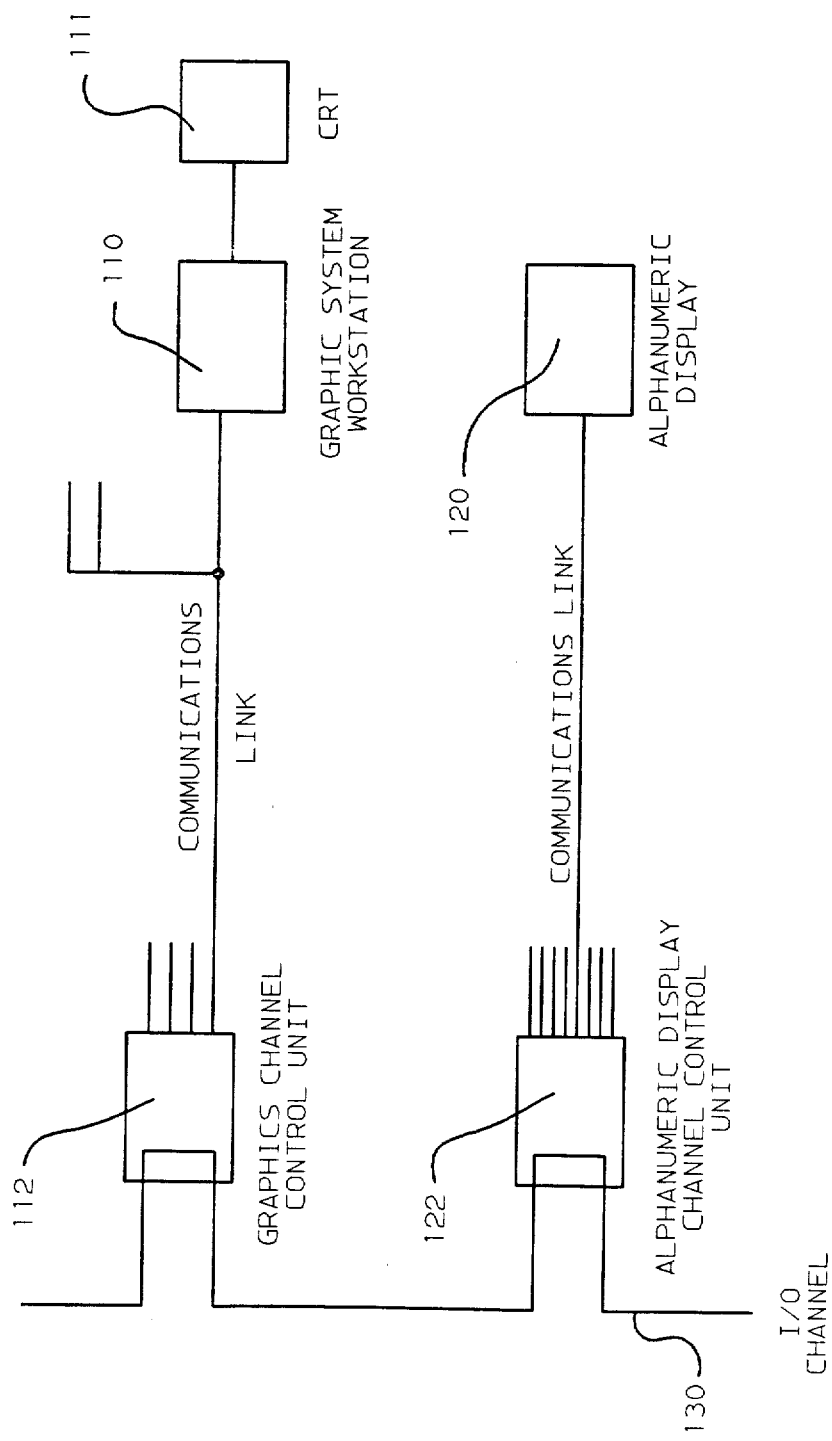
FIG. 1 is a block diagram of a PRIOR ART dual workstation system employing a separate terminal for alpha-numeric session and a separate terminal for graphics session and having separate control units for controlling the two separate terminals.

As seen in FIG. 1, in the prior art this need was met by having a graphics workstation controlled by a graphics channel control unit and an alpha-numeric display workstation such as an IBM 3278 or 3279 controlled by a display control unit such as an IBM 3274. The graphics channel control unit and the display control unit are each attached to the system channel such as an IBM system 370 input/output channel for connection to the host processor.

Figure 2:
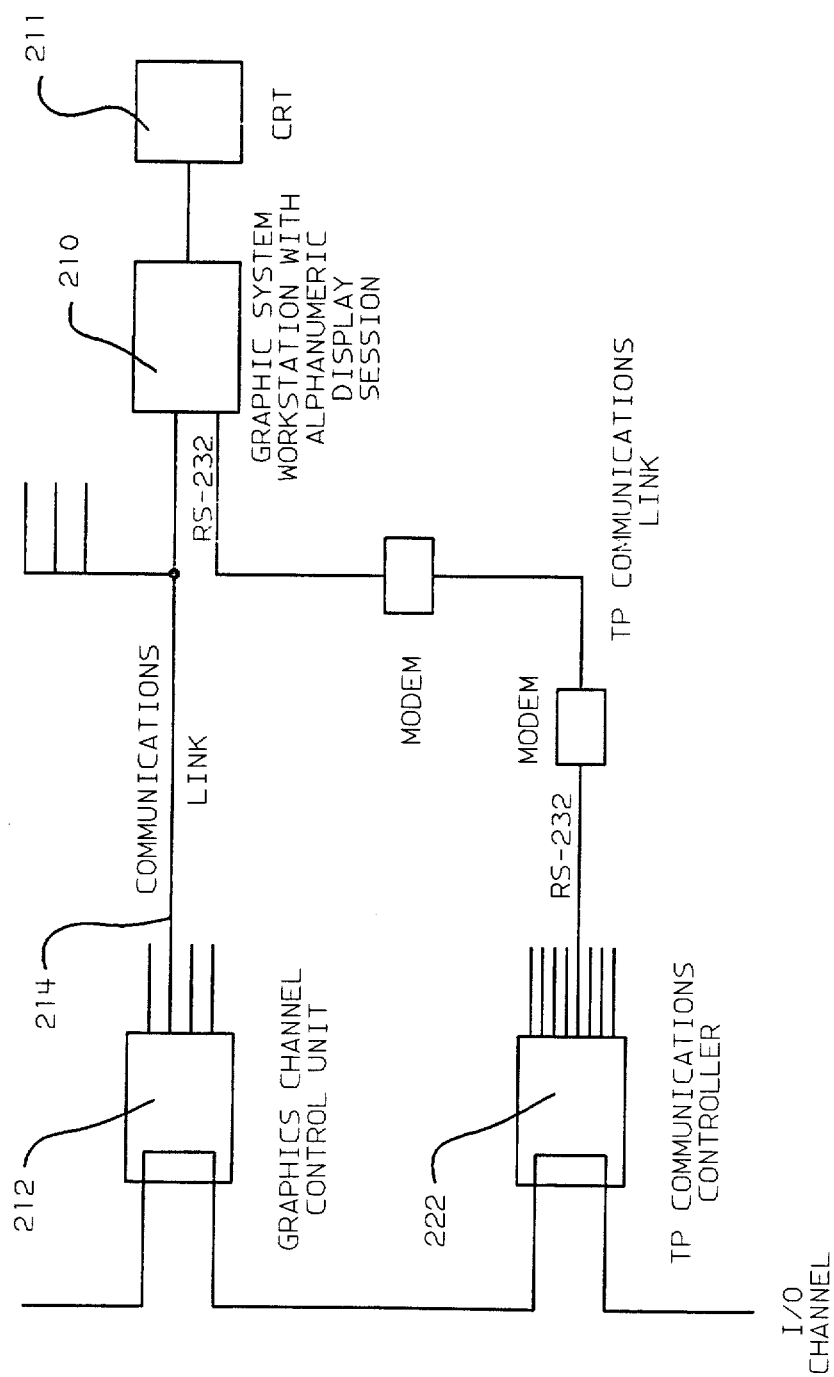
FIG. 2 is a block diagram of a PRIOR ART system in which a single graphics system workstation has also the capability to handle a alpha-numeric session wherein there are two control units, one for controlling the graphics session and one for controlling the alpha-numeric session.

A next step in the prior art was the development of an alpha-numeric session feature for incorporation in a graphics system workstation to permit the graphics system workstation to display both the graphics session and the alpha-numeric session. However, as is shown in FIG. 2, although there is only a single graphic system work- station 210, and a single CRT 211, in this prior art embodiment there was still a requirement for a graphics channel control unit 212 and a separate communications controller 222 for controlling the alpha-numeric session. The alpha-numeric session feature of the graphics workstation was driven by a cable separate from the graphics control unit cable 214 and through a pair of modems connected by a TP communications link.

Although the prior art design shown in FIG. 2 reduced the number of workstations from two to one, there was still a requirement for two separate controllers attached to the host input/output channel, each control unit controlling one of the two sessions at the graphics systems workstation. Switching between the graphics session and the alpha-numeric session in the graphics system workstation 210 was accomplished via a dedicated key on the workstation keyboard.

Figure 3:
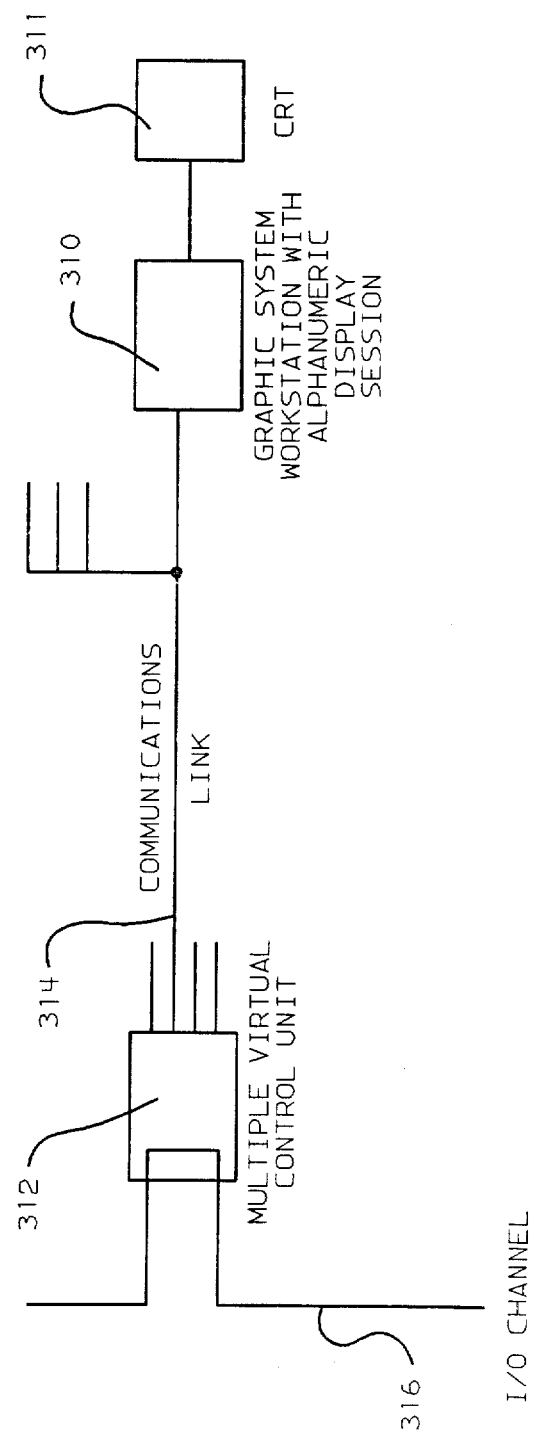
FIG. 3 is a block diagram of a system according to the present invention including a multiple virtual control unit for controlling a single workstation capable of both graphics and alpha-numeric sessions.

The system according to the present invention as shown in FIG. 3 combines the functions of the graphics control unit and the alpha-numeric control unit into a single control unit which is referred to as the multiple virtual control unit (VCU) 312. Graphics workstation 310 which includes alpha-numeric session feature and which supports CRT 311 is now connected to multiple virtual control unit 312 by a single communications line 314. It should be understood that multiple virtual control unit 312 may control a plurality of graphics system workstations each including the alpha-numeric session feature.

The graphics systems workstation with alpha-numeric session feature 310 differs from the prior art system described with reference to FIG. 2 only in the removal of the requirement for the second communications link to control the alpha-numeric session.

In the system according to the present invention as shown in FIG. 3, both the graphics session and alpha-numeric session to be displayed at graphics workstation 310 are controlled from multiple virtual control unit 312 along a single communications line 314.

Figure 4:
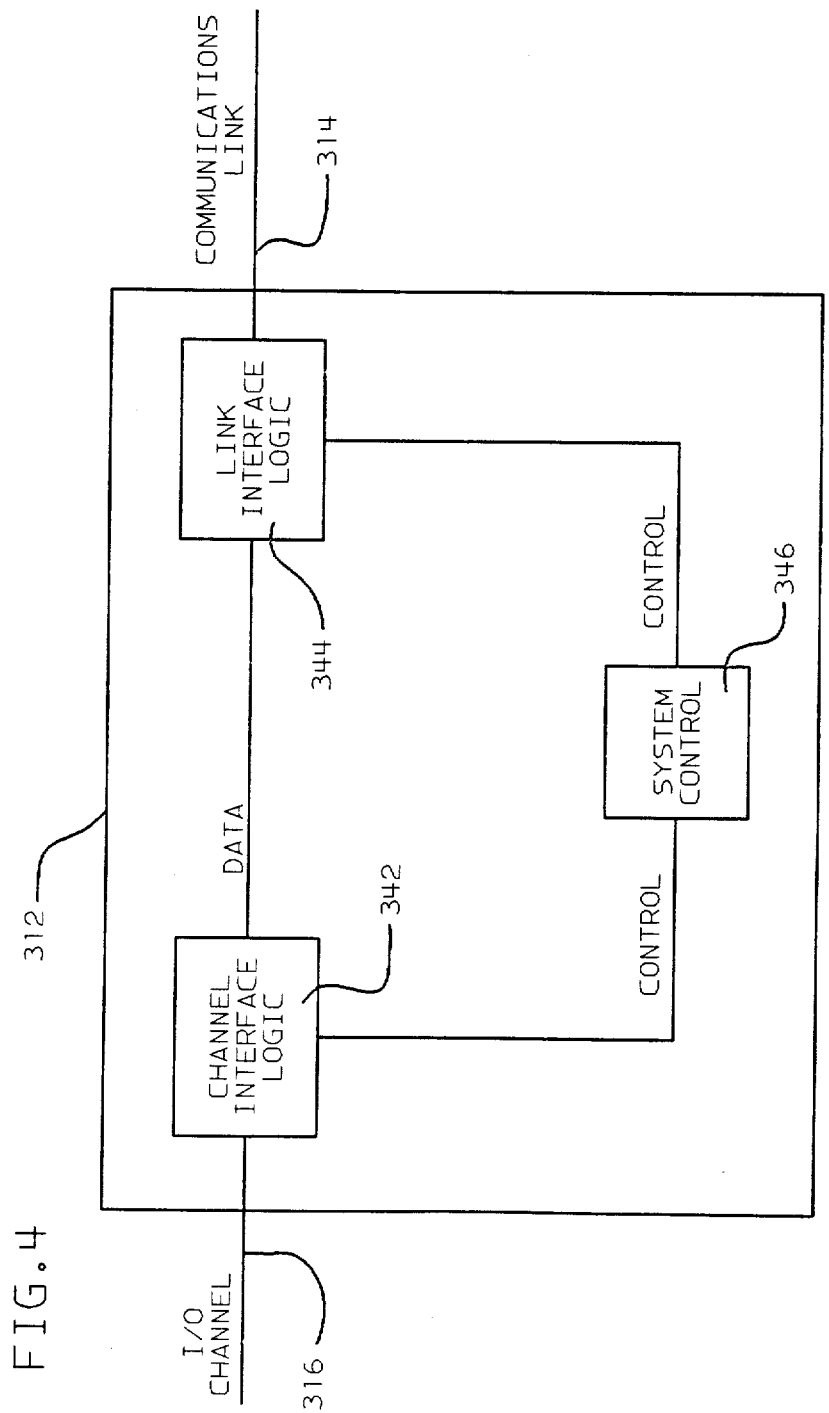
FIG. 4 is a block diagram of the organization of a multiple virtual control unit according to the present invention.

Referring now to FIG. 4, the functional units contained in multiple virtual control unit 312 will be further described. A channel interface logic block 342 communicates with the host input/output channel on channel interface 316 and operates under the control of system control block 346 to communicate data to link interface logic 344 which provides the interface over communications link 314 to the graphics workstation 310. System control 346 provides control to both the channel interface logic 342 and the link interface logic 344.

Figure 5:
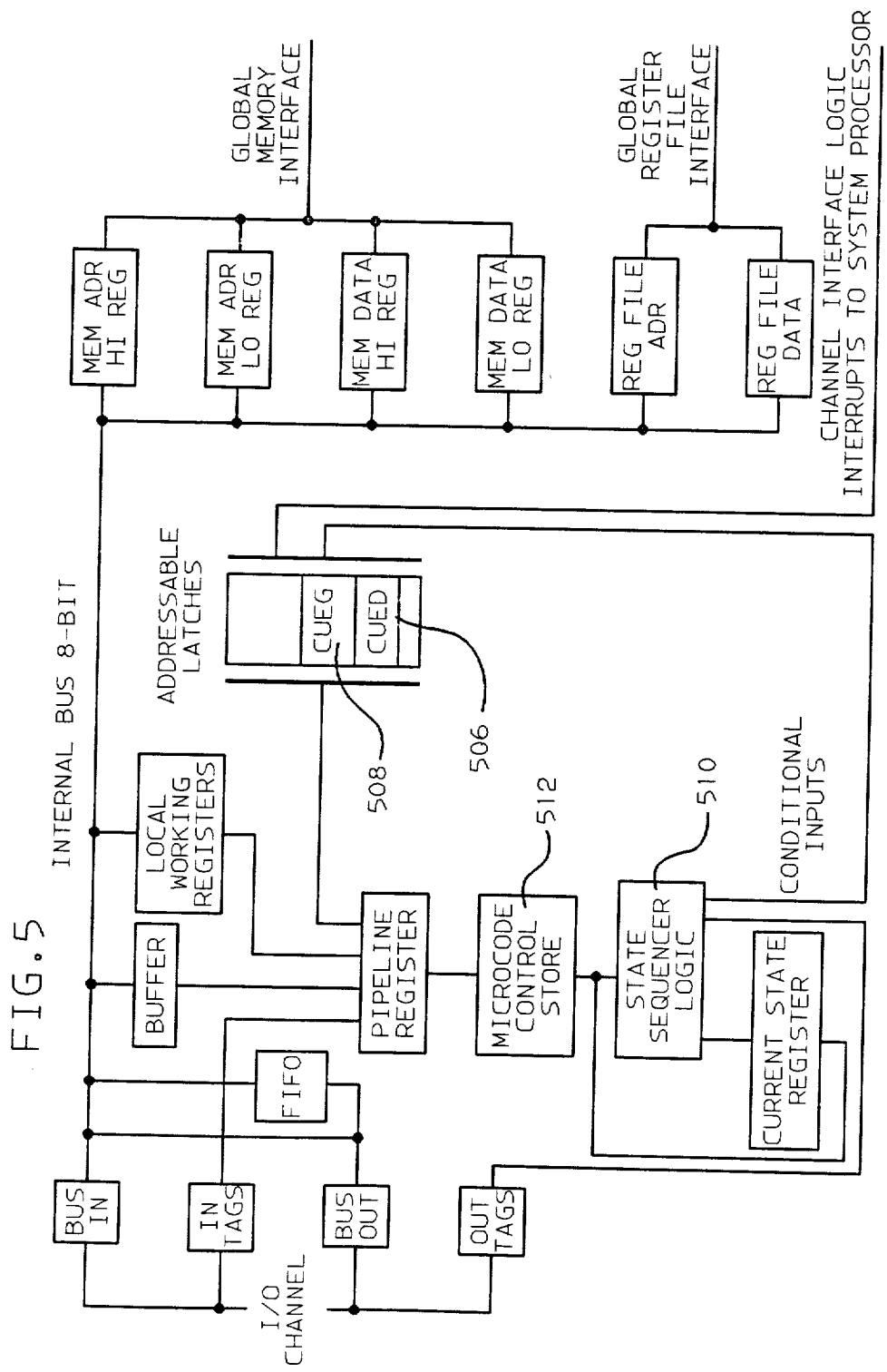
FIG. 5 is a block diagram of channel interface logic in accordance with the present invention.

Typically, the channel interface logic which is shown in greater detail in FIG. 5 includes a lookup function on an eight bit device address, a lookup function on an eight bit channel control word command, control unit busy status generation logic and control unit end status generation logic.

Figure 6B:
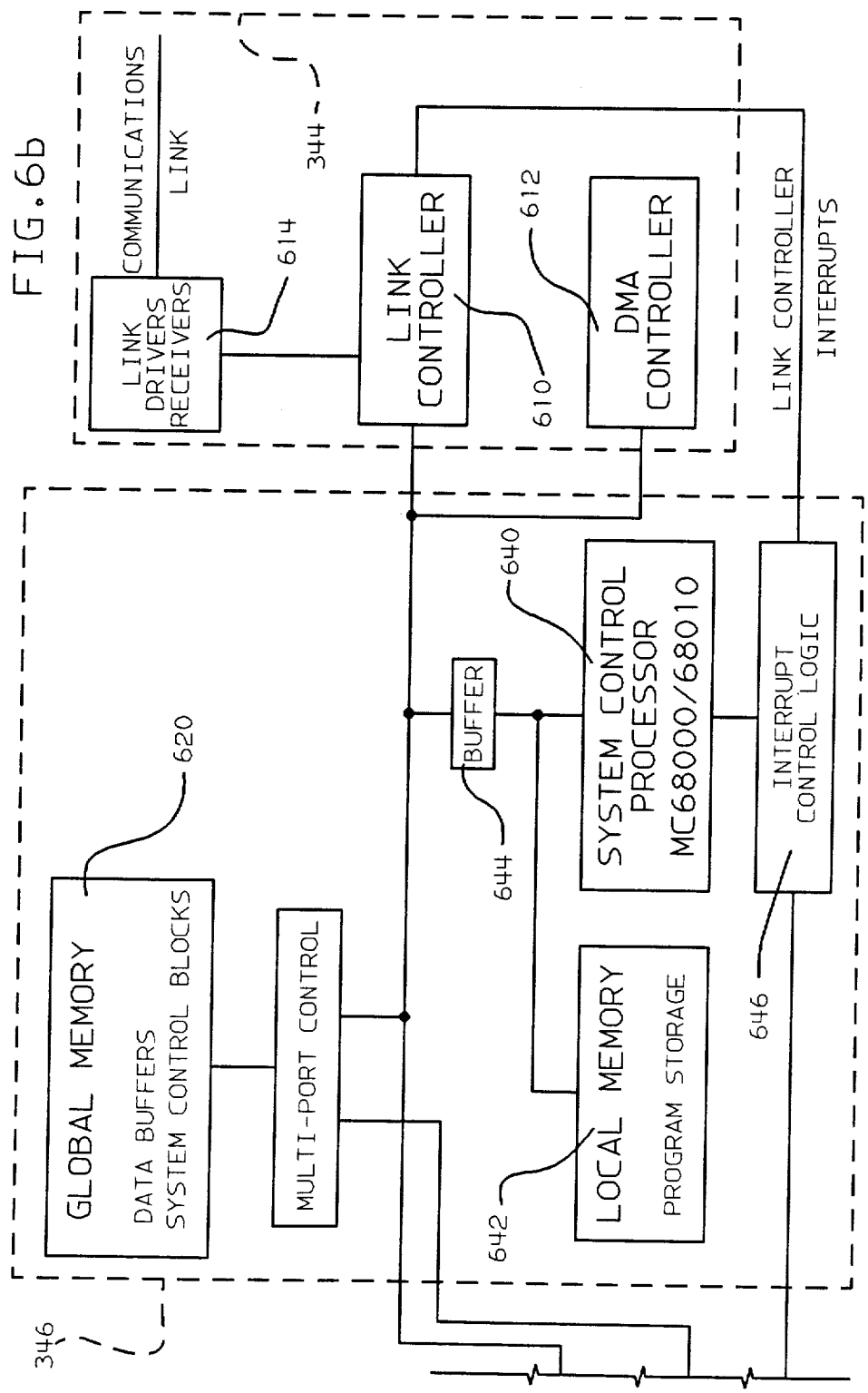

The link interface logic 344 shown in FIG. 6a and FIG. 6b, handles the data and control transfers between the multiple virtual control unit 312 and the graphics workstation 310 over the communications link 314, System control 346 also shown in FIG. 6a and FIG. 6b, initializes the channel interface logic 342 and the link interface logic 344 and schedules activities between the two interfaces.

An input/output data transfer operation on the channel interface 316 begins with the channel passing an eight bit address for the selection of a device to all attached control units such as multiple virtual control unit 312. (See FIGS. 4 and 5) Each control unit decodes the address to determine if the selection is for an address within that control unit's range of device addresses. The channel then passes to the selected control unit the channel control word command byte which is verified and used to generate an initial status byte which is then passed from the control unit to the channel. Data transfer for that command if any, then begins and is concluded by the passing of one or more ending status bytes from the control unit to the channel indicating that the operation has been completed with control unit end and/or device end. The channel-control unit interface protocol and operation is well known to those skilled in the art, having been first described with reference to the IBM System 360 as early as 1964 and in U.S. Pat. No. 3,400,371.

Referring now to FIGS. 5 and 6a and 6b, the channel interface logic 342, link interface logic 344 and system control 346 will be described in greater detail.

It should be noted that FIGS. 5 and 6a and 6b include elements which are necessary for proper control and data handling in a workstation control unit, but are not described herein since they are more fully described in the IBM 5080 Principles of Operation Manual Number GA23-0134-0. Input and output registers, register control, local working registers, buffers and the state sequencer logic and control generally are described in the referenced document. Further, with reference to FIG. 6a and 6b, the link controller 610, DMA controller 612, and driver receivers 614, which make up link interface logic 344 are all described in the referenced manual.

Additionally, the global memory with multi-port control 620, the system control processor 640 with local memory 642, buffer 644, and interrupt control logic 646 are also generally described in the referenced manual.

Global register file 650 contains the virtual control unit selection mechanism which will be described in greater detail with reference to FIG. 7.

Figure 7:
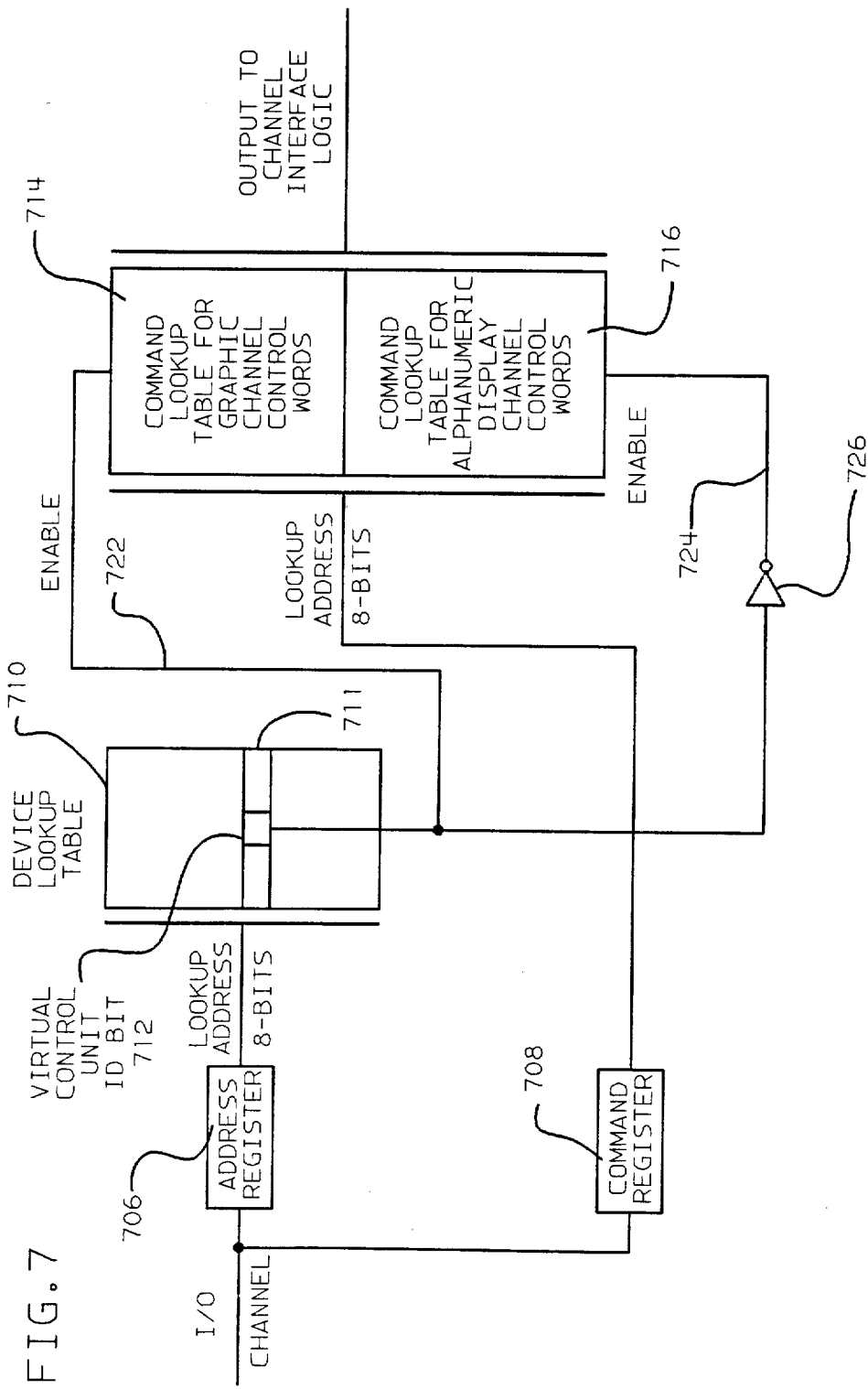
FIG. 7 is a block diagram of control logic for controlling selection of a multiple virtual control unit.

Referring now to FIG. 7, the multiple virtual control unit selection mechanism and the device address and channel control word command lookup tables will be described.

The virtual control unit selection logic shown in FIG. 7 includes an Address Register 706 and a Command Register 708 connected to the channel interface 316 (see FIG. 3.) for storing device address and command information received from the host processor over the channel interface.

Address Register 706 stores a lookup address which selects an entry 711 in device look up table 710 to access a selected device and through a virtual control unit ID bit 712 in entry 711 enable either command look up table 714 for a graphics session or command look up table 716 for an alpha-numeric display session.

Command Register 708 stores an address of a pair of locations in command look up table 714, 716. Only one command look up table 714, 716 is enabled at any time by the value of virtual control unit ID bit 712 so only one command is selected. The selected command being is either a Graphics channel control word or an alpha-numeric channel control word.

Device address lookup table 710 contains 256 entries such as entry 711 each containing device state bits, device configuration bits, and a virtual control unit identification bit 712. Lookup table 710 is initialized by system control 346 (see FIG. 6a and 6b) based on configuration information. Channel interface logic 342 reads the table during channel selection sequences. An address issued by the channl during a selection may be within either the virtual graphics control unit range, virtual alpha-numeric display unit range, or neither for a given multiple virtual control unit 312. A range of addresses is a group of contiguous addresses. The two virtual control unit ranges for the graphics session and the alpha-numeric session may not overlap but they need not be contiguous with respect to each other since they represent distinct control units.

Multiple virtual unit 312 includes two 256 entry channel control word command lookup tables 714 and 716 for the graphics virtual control unit and the alpha-numeric display virtual control unit respectively. The choice of command lookup table is based on the virtual control unit ID bit 712 read from the device address lookup table entry 711 during channel selection. The information contained in the command tables 714, 716 is used to control data transfer and status generation by channel interface logic 342. The command lookup tables 714 and 716 are also initialized by the microcode controlled system control processor 346. Channel interface logic 342 places the selected device address and channel control word command into Global register file 650 (See FIG. 6a and 6b) when a channel selection is accepted for an address within either the graphics session range or the alpha-numeric display session range. Virtual control unit identification bit 712 is used to enable either graphics command lookup table 714 or alpha-numeric display lookup table 716 through enable lines 722 and 724. Enable line 724 is the inverse of enable line 722 and is generated by inverter 726.

Referring again to FIGS. 4 and 6a and 6b, when channel interface logic 342 interrupts system control processor 346 through interrupt control logic 646 to inform it that a channel selection is in progress, system control processor 640 under the control of local program storage 642 determines which type of processing, graphics or alpha-numeric display is required for the selection and initiates the appropriate link interface activity in link interface logic 344 through link controller 610. This determination is made by examining the virtual control unit ID bit 712 in the device look up table entry 711 for the selected device address.

As a convention, it may be stated that if the virtual control unit ID bit 712 is 0 then a graphics session is indicated and if the virtual control unit ID bit 712 is 1 then an alpha-numeric display session is indicated.

System control processor 346 microcode maps the two channel address ranges into two distinct link address ranges in global memory 620 using a one to one mapping algorithm and passes control and data over the communications line 314 to the graphics workstation 310 via link interface logic drivers and receivers 614 controlled by link controller 610.

Link interface in the graphics workstation 310 separates the information flowing on communications link 314 based on link address and steers the information either to an internal graphics processor (not shown) or a alpha-numeric display processor (not shown) within the graphics workstation.

Both the graphics processor and the alpha-numeric display processor are known implementations and are not part of the present invention. These processors were both known in the prior art system described with reference to FIG. 2 above. The image of either the graphics or alpha-numeric display to be presented on the CRT 311 is then selected by a dedicated key on the graphics workstation keyboard.

It is also possible to display windows of the graphics session and the alpha-numeric session simultaneously on work station CRT 311. Such windowing is under control of the work station control program.

Occasionally, there will be contention between simultaneous operations of the two virtual control units. Since the multiple virtual control units 312 has the appearance of two real control units to the host input/output channel, certain busy conditions arise due to the ability of the channel to initiate and maintain multiple simultaneous selections to multiple control units. The dual virtual control unit nature requires a unique logic solution to prevent busy lookups when the channel attempts to select one of the virtual control units while the other is operating with a previously initiated selection. Control units are allowed to respond to selection attempts with a control unit busy status resulting in the queuing of the selection attempt. The selection is later re-tried by the channel when the control unit passes an asynchronous control unit and (CUE) status byte to the channel. The multiple virtual control unit uses this facility to queue a selection attempt on a virtual control unit address if there is already a selection in progress on an address within the other virtual control unit range. This facility requires that a control unit remember that it had responded with control unit busy to one or more previous selection attempts and later generated an owed CUE status.

Figure 8A:
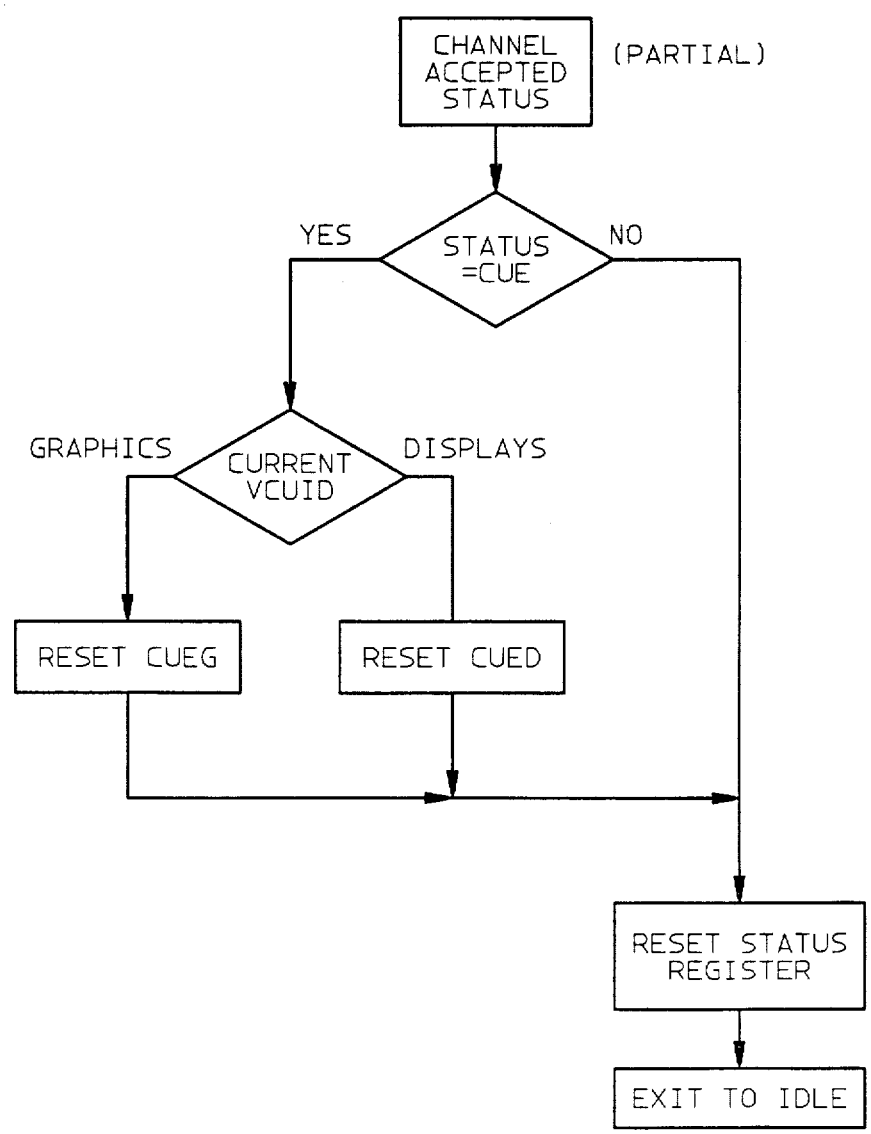
FIGS. 8a and FIG. 8b is a flow chart of channel interface logic control operations for resolving contention between simultaneous operations to the two virtual control units within the multiple virtual control unit according to the present invention.
Figure 8B:
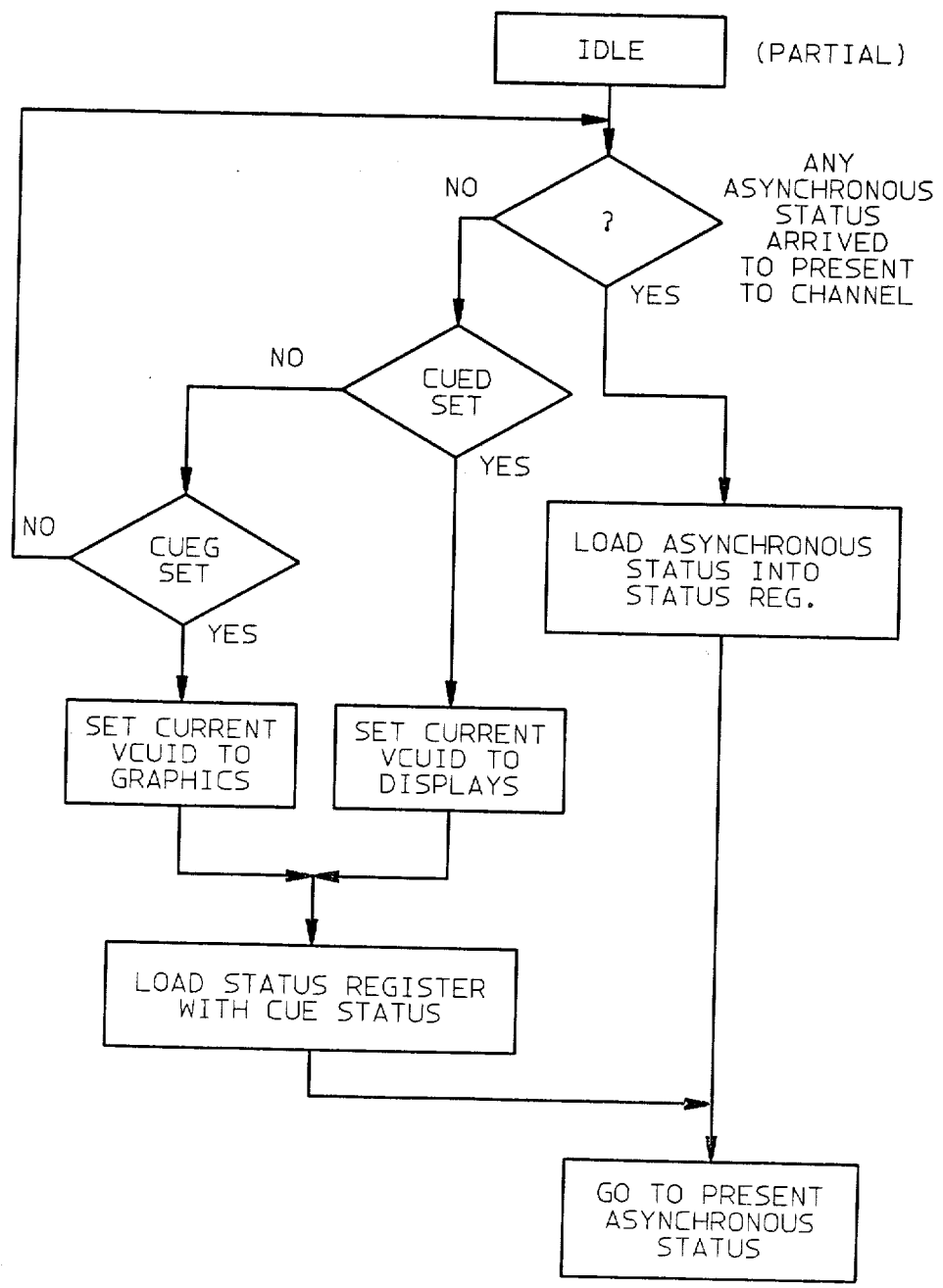

Since the two virtual control units in the multiple virtual unit 312 are symmetrical, two independent CUE owed latches CUED (Control Unit End Display) 506 and CUEG (Control Unit End Graphics) 508 controlled by state sequencer logic 510 and microcode control store 512 logic for control are required. (See FIGS. 5, 8a and 8b).

For example if the multiple virtual control unit for 312 had accepted a selection on the graphics virtual control unit and the channel had attempted to select a device on the alpha-numeric display virtual control unit, the multiple virtual control unit 312 responds with control unit busy status setting CUED. When the operation with the graphics virtual control unit is completed the multiple virtual control unit 312 would then send the asynchronous owed CUE status by interrogating latch CUED and the queued selection attempt to the alpha-numeric display virtual control unit would be reissued by the channel. The converse is also true. Note that latches CUED and CUEG are reset only when the associated CUE status is accepted by the channel.

Figure 9:
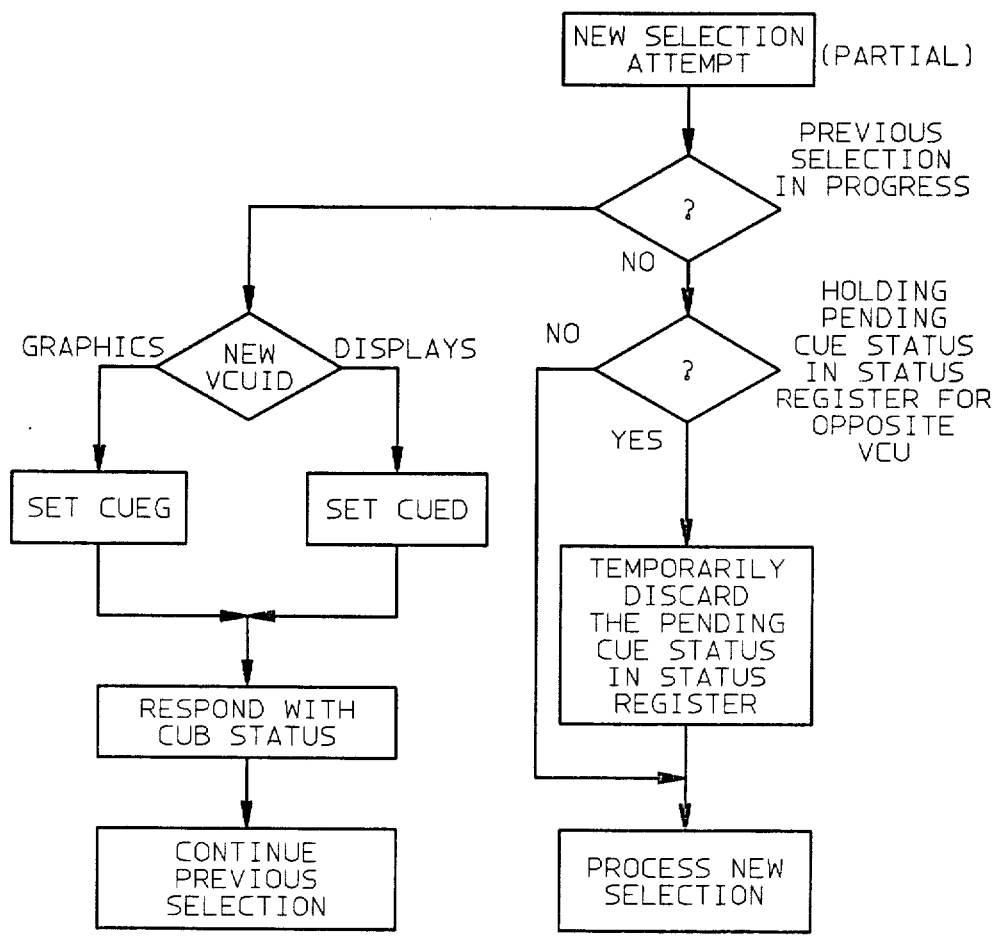
FIG. 9 is a flow chart of the backoff algorithm to eliminate the thrashing due to simultaneous selection attempts.

A backoff algorithm (shown in FIG. 9) is used by the channel interface logic 342 to resolve the following reselection attempts between two virtual control units of different classes by the multiple virtual control unit. In the case where the channel selected a device on a graphics VCU, and a second selection is attempted to a device on an alpha-numeric VCU, which is responded to with a CU busy status, selection is queued and CUED is set. After ending status associated with the graphics selection is presented by the multiple virtual control unit 312 to the channel, the channel interface logic 342 is holding the pending CUE status associated with the alphanumeric VCU. The new selection (for the graphics control unit) therefore receives a control unit busy status thus setting latch CUEG and queuing the selection. Multiple virtual control unit 312 then passes pending CUE status to the channel for the alpha-numeric display virtual control unit resetting CUED latch and proceeds to generate another CUE this time for the graphics virtual control unit. When the queued selection for the alpha-numeric display virtual control unit is retried, the selection finds the multiple virtual control unit 312 holding a pending CUE status for the graphics virtual control unit. This condition could continue ad infinitum resulting in a busy thrashing hang-up. The problem is solved by a backoff algorithm in the channel interface logic 342. The flow diagram for the microcode control of system control 346 is shown in FIG. 9. If the multiple virtual control unit 312 is holding a pending CUE status for a virtual control unit when selection is started for the opposite virtual control unit, the CUE status is temporarily discarded not resetting the associated CUE owed latch CUED or CUEG and accepting the new selection. This breaks the infinite loop of control unit busy-control unit end between the two virtual control units.

The multiple virtual control unit capability creates the appearance of a graphics virtual control unit and a alpha-numeric display virtual control unit such that the graphics channel programs are executed through the graphics virtual control unit and alpha-numeric display applications are executed through alpha-numeric display virtual control unit where both applications are passed down the same communications link 314 to an attached graphics workstation 310.

Thus, while the invention has been described with reference to preferred embodiments thereof, it will be understood by those skilled in the art that various changes in form and details may be made without departing from the scope of the invention.

What is claimed is:

1. Apparatus for controlling one or more multiple session work stations, each supporting one or more classes of session, comprising: first means for controlling communication with one or more host channels; second means for controlling communication with one or more work stations; third means connected to said first and second control means for controlling command and data flow between said first and second control means; and fourth means, connected to said first means and to said third means, for selecting one of a plurality of classes of work station sessions in response to a channel command of a type associated with said one class.

2. Apparatus according to claim 1, wherein said second means further comprises:
   a plurality of virtual control units, each controlling one class of said work station sessions.

3. Apparatus according to claim 1, wherein said fourth means further comprises:
   one or more look up tables each having a plurality of entries, each entry containing a class identifier.

4. Apparatus according to claim 1, wherein said fourth means further comprises:
   a plurality of command look up tables, there being at least one such look up table for each work station class.

5. Apparatus according to claim 1, wherein said third means further comprises:
   means for resolving contention between simultaneous operations directed to a plurality of work station classes.

6. Apparatus according to claim 5, wherein said resolving means further comprises:
   a plurality of latches for storing a status for each work station class; and
   control means associated with said third means for responding to said simultaneous operations in accordance with said status contained in said latches.

* * * * *